United States Patent
Lin et al.

(10) Patent No.: US 9,722,658 B2
(45) Date of Patent: Aug. 1, 2017

(54) CONTROL METHOD OF RF SWITCH MODULE

(71) Applicant: AIROHA TECHNOLOGY CORP., Hsinchu (TW)

(72) Inventors: Heng-Chih Lin, Hsinchu (TW); Chien-Kuang Lee, Hsinchu (TW); Jui-Hung Wei, Hsinchu (TW); Sheng-Fu Yu, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 0 days.

(21) Appl. No.: 15/063,628

(22) Filed: Mar. 8, 2016

(65) Prior Publication Data

US 2016/0336993 A1 Nov. 17, 2016

Related U.S. Application Data

(60) Provisional application No. 62/162,019, filed on May 15, 2015.

(51) Int. Cl.
| | |
|---|---|
| *H04B 1/00* | (2006.01) |
| *H04B 1/48* | (2006.01) |
| *H04W 24/00* | (2009.01) |
| *H04B 1/56* | (2006.01) |

(52) U.S. Cl.
CPC .............. *H04B 1/48* (2013.01); *H04W 24/00* (2013.01); *H04B 1/56* (2013.01)

(58) Field of Classification Search
USPC ........................ 455/77, 78; 370/277; 343/876
See application file for complete search history.

(56) References Cited

U.S. PATENT DOCUMENTS

| | | | | |
|---|---|---|---|---|
| 7,853,222 | B2 * | 12/2010 | Robert ...................... | H04B 1/48 343/876 |
| 8,547,157 | B1 * | 10/2013 | Mangold .......... | H03K 17/04123 327/308 |
| 2013/0217343 | A1 * | 8/2013 | Tenbroek .............. | H04W 24/00 455/77 |
| 2014/0112213 | A1 * | 4/2014 | Norholm .................. | H04B 1/56 370/277 |
| 2015/0133067 | A1 * | 5/2015 | Chang ...................... | H04B 1/48 455/78 |

* cited by examiner

*Primary Examiner* — Ganiyu A Hanidu
(74) *Attorney, Agent, or Firm* — Rosenberg, Klein & Lee

(57) ABSTRACT

The present invention relates to a control method of an RF switch module. The RF switch module comprises a control device and a switch device. The control device is electrically connected to the switch device, and the control device is able to provide a control voltage to the switch device, and turn on or turn off the switch device. Further, the control device determines frequency or voltage value of the control voltage provided to the switch device according to the power or frequency of an RF signal transmitted by the switch device.

15 Claims, 5 Drawing Sheets

CONTROL METHOD OF RF SWITCH MODULE

REFERENCE TO RELATED APPLICATIONS

This application is based on Provisional application Ser. No. 62/162,019, filed May 15, 2015.

FIELD OF THE INVENTION

The present invention relates to a control method of an RF switch module. The frequency and voltage value of a control voltage provided to a switch device can be adjusted according to the frequency and power of an RF signal transmitted by the switch module.

BACKGROUND

FIG. 1 is a block diagram of a common RF front end device. The RF (radio frequency) front end device 10 is used to transmit or receive an RF signal, and comprises an antenna unit 11, a first switch unit 131, a second switch 133, a receiving unit 151 and a transmitting unit 153. The receiving unit 151 and transmitting unit 153 are connected to the antenna unit 11 via the first switch unit 131 and the second switch unit 133 respectively.

The first switch unit 131 may be turned on, and the second switch unit 133 may be turned off. Thus, the antenna unit 11 is able to be connected to the receiving unit 151 via the first switch unit 131, and the RF signal received by the antenna unit 11 is able to be transmitted to the receiving unit 151.

Otherwise, the first switch unit 131 may be turned off, and the second switch unit 133 may be turned on. Thus, the antenna unit 11 is able to be connected to the transmitting unit 153 via the second switch unit 133, and the transmitting unit 153 is able to transmit the RF signal to the antenna unit 11.

SUMMARY

It is one object of the present invention to provide a control method of an RF switch module. The control device determines frequency or voltage value of the control voltage provided to the switch device according to frequency and/or power of the RF signal transmitted by the switch device to improve the isolation of the switch device.

It is one object of the present invention to provide a control method of an RF switch module. The control device determines frequency or voltage value of the control voltage provided to the switch device according to the switch device that is used to transmit or receive the RF signal.

For achieving above objects, the present invention provides a control method of an RF switch module, the RF switch module comprising a control device and a switch device, and comprising the steps of: receiving a first RF signal from an antenna unit by the switch device; providing a control voltage with lower frequency to the switch device by the control device; transmitting a second RF signal from the switch device to the antenna unit; and providing the control voltage with higher frequency to the switch device by the control device.

The present invention provides another control method of an RF switch module, the RF switch module comprising a control device and a switch device, and comprising the steps of: transmitting an RF signal by the switch device; and determining frequency or voltage value of a control voltage provided to the switch device by the control device according to frequency or power of the RF signal transmitted by the switch device.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
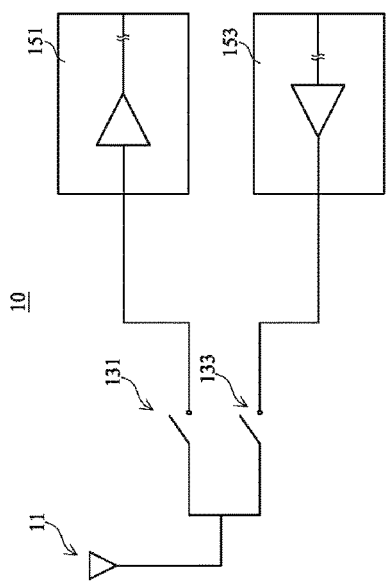
FIG. 1 is a block diagram of a common RF front end device.
Figure 2:
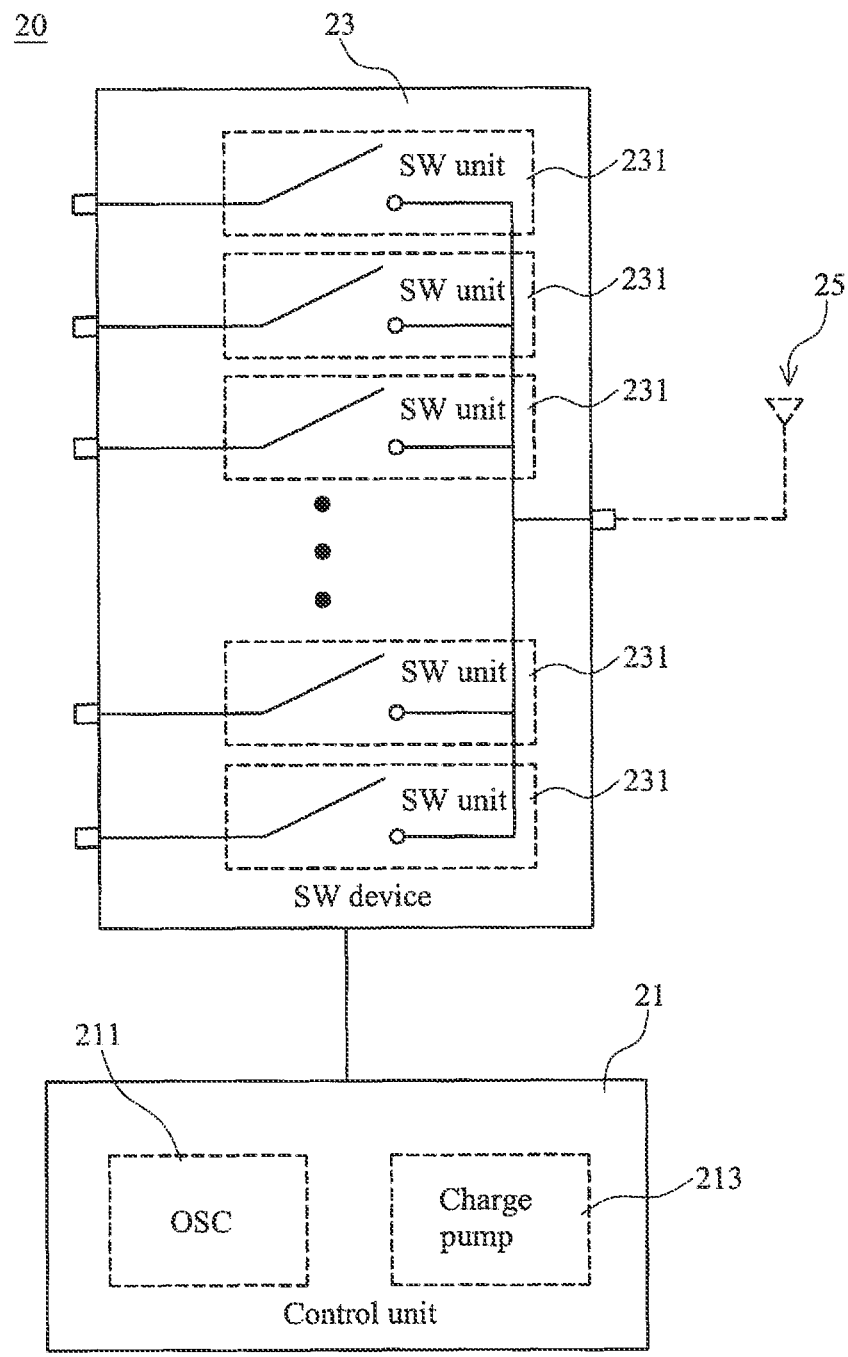
FIG. 2 is a block diagram of an RF switch module according to an embodiment of the invention.
Figure 3:
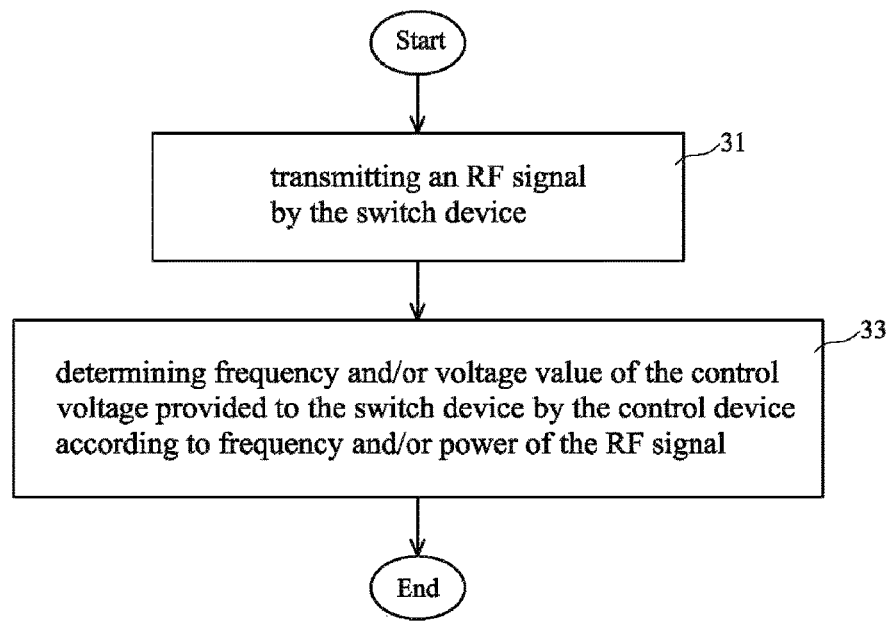
FIG. 3 is a flow chart of a control method of an RF switch module according to an embodiment of the present invention.

FIG. 2 is a block diagram of an RF switch module according to an embodiment of the invention. FIG. 3 is a flow chart of a control method of an RF switch module according to an embodiment of the present invention. The RF switch module 20 comprises a control device 21 and a switch device 23. The control device 21 is electrically connected to the switch device 23 to control the switch device 23. For instance, the control device 21 is able to turn on or turn off each switch unit 231 of the switch device 23 respectively. Further, the control device 21 is able to provide a control voltage Vc to the switch device 23.

In one embodiment of the invention, the switch device 23 can be used to transmit the RF signal with various frequency and/or power, as the step 31.

The control device 21 is able to provide the control voltage Vc to the switch device 23 with various frequency and/or voltage value. In particular embodiment, the control device 21 determines or selects frequency and/or voltage value of the control voltage Vc according to frequency and/or power of the RF signal transmitted by the switch device 23, as the step 33.

The control voltage Vc provided to the switch device 23 by the control device 21 may be a negative voltage with high frequency, such as 0.5 MHz to 3 MHz, to improve the isolation of the switch device 23. In one embodiment of the invention, the frequency of the control voltage Vc provided to the switch device 23 by the control device 21 may be smaller than 1 MHz, or larger than 1 MHz, 2 MHz or 3 MHz.

In generally, when the switch device 23 transmits the RF signal with higher frequency and/or higher power, the control device 25 will provide the control voltage Vc with higher frequency and/or higher voltage value to the switch device 23 to improve isolation of the switch device 23.

Figure 4:
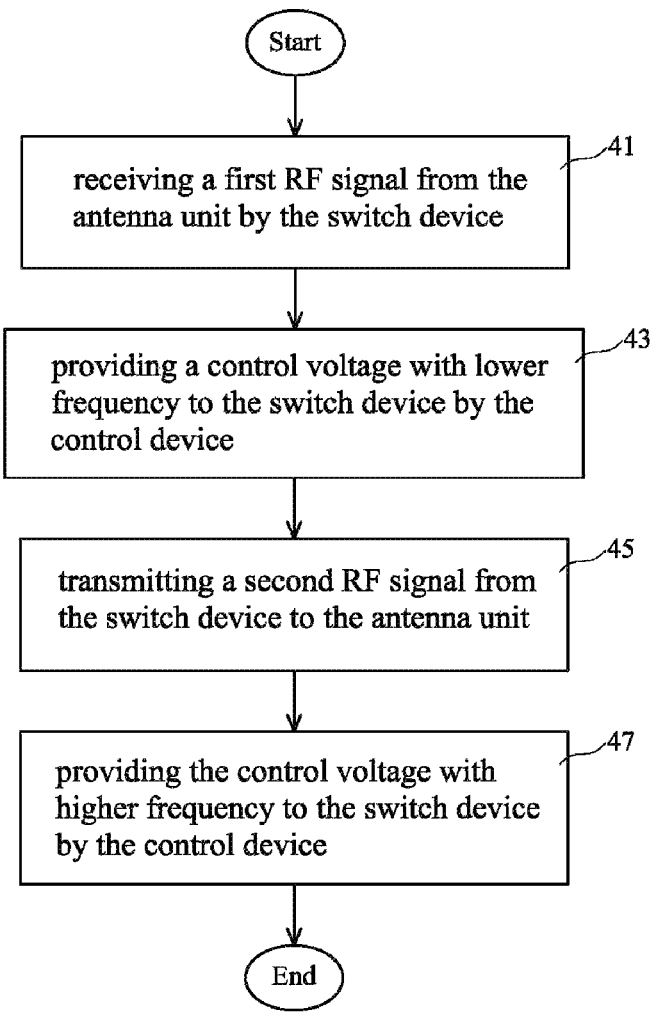
FIG. 4 is a flow chart of a control method of the RF switch module according to another embodiment of the present invention.

FIG. 4 is a flow chart of a control method of the RF switch module according to another embodiment of the present invention. Please referring to FIG. 2, the RF switch module 20 comprises a control device 21 and a switch device 23. The control device 21 is electrically connected to the switch device 23 to control the switch device 23. For instance, the control device 21 is able to turn on or turn off each switch unit 231 of the switch device 23 respectively. Further, the control device 21 is able to transmit a control voltage Vc to the switch device 23.

The switch device 23 is connected to an antenna unit 25 to receive a first RF signal from the antenna unit 25, such as RX mode, or transmit a second RF signal to the antenna unit 25, such as TX mode. The control device 21 is able to determine or select the frequency and/or voltage value of the control voltage Vc provided to switch device 23 according to TX mode or RX mode of the switch device 23.

The switch device 23 receives a first RF signal from the antenna unit 25, as the step 41. The first RF signal received by the switch device 23 form the antenna unit 25 usually has lower power, and thus the control device 21 provides the control voltage Vc with lower frequency to the switch device 23, as the step 43. Thereafter, the isolation of the switch device 23 and/or the switch unit 231 that is turned off is able to be improved to isolate the first RF signal received from the antenna unit 25. For instance, the frequency of the control voltage Vc may be smaller than 1 MHz.

The switch device 23 transmits a second RF signal to the antenna unit 25, as the step 45. The second RF signal transmitted by the switch device 23 to antenna unit 25 usually has higher power, and thus the control device 21 provides the control voltage Vc with higher frequency to the switch device 23, as the step 47. Thereafter, the isolation of the switch device 23 and/or the switch unit 231 that is turned off is able to be improved to isolate the second RF signal transmitted to the antenna unit 25. For instance, the frequency of the control voltage Vc may be between 2 MHz and 3 MHz. In one embodiment of the invention, the frequency of the control voltage Vc is different from the RF signal, such as the first and/or second RF signal, to avoid interference between the RF signal and the control voltage Vc.

In above embodiment of the invention, the control device 21 determines or selects the frequency of the control voltage Vc provided to the switch device 23 according the switch device 23 in TX mode or in RX mode to improve isolation of the switch module 20. In actual application, the switch device 23 in TX mode may comprise two or more than two kinds of transmitting power. Thereafter, the control device 23 may provide two or more than two kinds of control voltages Vc with different frequency or voltage value to the switch device 23, thus to improve isolation of the switch module 20.

In one embodiment of the invention, the control voltage Vc may be divided into three ranges, such as smaller than a first frequency f1, larger than the first frequency f1 and larger than a second frequency f2, wherein the first frequency f1 is smaller than the second frequency f2. It is one embodiment of the invention to divide the control voltage Vc into three ranges, and is not limitation of the invention. In other embodiment, the control voltage Vc may be divided into more than three ranges.

The first RF signal received by the switch device 23 form the antenna unit 25 usually has lower power, and thus the control device 21 provides the control voltage Vc with lower frequency to the switch device 23. For instance, the frequency of the control voltage Vc may be smaller than the first frequency f1. Thereafter, the isolation of the switch device 23 and/or the switch unit 231 that is turned off is able to be improved to isolate the first RF signal received from the antenna unit 25. For instance, the first frequency f1 may be 1 MHz, and the frequency of the control voltage Vc is smaller than 1 MHz.

The switch device 23 may transmit the second RF signal with middle power, such as between 20 dBm and 30 dBm, to the antenna unit 25, and thus the control device 21 provides the control voltage Vc with middle frequency to the switch device 23. For instance, the frequency of the control voltage Vc may be larger than the first frequency f1 or larger than the first frequency f1 and smaller than the second frequency f2. Thereafter, the isolation of the switch device 23 and/or the switch unit 231 that is turned off is able to be improved to isolate the second RF signal transmitted to the antenna unit 25 by the switch device 23. For instance, the first frequency f1 may be 1 MHz and the second frequency f2 may be 2 MHz or 3 MHz, and the frequency of the control voltage Vc is larger than 1 MHz, or larger than 1 MHz and smaller than 2 MHz or 3 MHz.

The switch device 23 may transmit the second RF signal with higher power, such as larger than 30 dBm, to the antenna unit 25, and thus the control device 21 provides the control voltage Vc with higher frequency to the switch device 23. For instance, the frequency of the control voltage Vc may be larger than the second frequency f2. Thereafter, the isolation of the switch device 23 and/or the switch unit 231 that is turned off is able to be improved to isolate the second RF signal transmitted by the switch device 23 to the antenna unit 25. For instance, the second frequency f2 may be 2 MHz or 3 MHz, and the frequency of the control voltage Vc is larger than 2 MHz or 3 MHz.

In one embodiment of the invention, the switch device 23 may comprise a plurality of switch units 231, and each switch unit 231 is able to transmit or receive RF signal with different power and/or frequency respectively. One or more than one switch unit 231 can be turned on to receive or transmit RF signal, and other switch units 231 are turned off.

The control device 21 is able to know the frequency and/or power of the RF signal transmitted or received by the switch device 23 according to the switch unit 231 that is turned on to transmit or receive the RF signal, and then determine frequency and/or voltage value of the control voltage Vc provided to the switch device 23. For instance, the control device 21 determines frequency and voltage value of the control voltage Vc provided to the switch unit(s) 231 according to the switch unit(s) that is turned on to improve isolation of the switch unit(s) 231 that is turned off.

Each switch unit 231 of the switch device 23 may comprise at least one MOSFET (metal-oxide-semiconductor field-effect transistor), and the control device 21 is connected to each MOSFET of the switch device 23. The control device 21 provides the control voltages Vc to each MOSFET to turn on or turn off each MOSFET respectively. In actual application, the control device 21 may provide control voltages Vc with different frequency or voltage value to each MOSFET respectively according to frequency and/or power of the RF signal transmitted or received by the switch device 23 to improve isolation of MOSFETs. In particular embodiment, the switch device 23 and/or switch unit 231 may comprise at least one 2.5V MOSFET(s), and the control voltage Vc may be smaller than −1.2V or −2V.

In one embodiment of the invention, the control device 21 may comprise an oscillation unit 211 and a charge pump 213. The oscillation unit 211 is able to adjust frequency of the control voltage Vc outputted by the control device 21, and the charge pump 213 is able to adjust the voltage value of the control voltage Vc outputted by the control device 21.

In one embodiment of the invention, the switch device 23 is connected to an antenna unit 25 to receive the first RF signal from the antenna unit 25, such as RX mode, or transmit the second RF signal to the antenna unit 25, such as TX mode. Further, the control device 21 is able to determine or select the frequency of the control voltage Vc provided to the switch device 23 according the type of the first RF signal received by the switch device 23 from the antenna unit 25 or the type of the second RF signal transmitted by the switch device 23 to the antenna unit 25.

The RF switch module 20 may be applied in a portable communication device, such a mobile phone, a smart phone or a tablet computer, for receiving or transmitting a second generation RF signal (2G RF signal), a third generation RF signal (3G RF signal) or a fourth generation RF signal (4G RF signal). In particular embodiment, the switch device 23 operates in RX mode to receive the 2G RF signal, the 3G RF signal or the 4G RF signal with lower power from the antenna unit 25, and the control device 21 provides the control voltage Vc with lower frequency, such as smaller than the first frequency f1, to the switch device 23 and/or the switch unit 231 to improve isolation of the switch device 23 and/or the switch unit 231 that is turned off to isolate the 2G RF signal, the 3G RF signal or the 4G RF signal received from the antenna unit 25 by the switch device 23 and/or the switch unit 231. For instance, the first frequency f1 may be 1 MHz, and the frequency of the control voltage Vc may be smaller than 1 MHz.

In other embodiment, the switch device 23 operates in TX mode to transmit the 3G RF signal or the 4G RF signal with middle power to the antenna unit 25, and the control device 21 provides the control voltage Vc with middle frequency, such as larger than the first frequency or larger than the first frequency f1 and smaller than the second frequency f2, to the switch device 23 and/or the switch unit 231 to improve isolation of the switch device 23 and/or the switch unit 231 that is turned off to isolate the 3G RF signal or the 4G RF signal transmitted to the antenna unit 25 by the switch device 23 and/or the switch unit 231. For instance, the first frequency f1 may be 1 MHz and the second frequency f2 may be 2 MHZ or 3 MHz, and the frequency of the control voltage Vc may be larger than 1 MHz or larger than 1 MHz and smaller than 2 MHz or 3 MHz.

The switch device 23 operates in TX mode to transmit the 2G RF signal with higher power to the antenna unit 25, and the control device 21 provides the control voltage Vc with higher frequency, such as larger than the second frequency f2, to the switch device 23 and/or the switch unit 231 to improve isolation of the switch device 23 and/or the switch unit 231 that is turned off to isolate the 2G RF signal transmitted to the antenna unit 25 by the switch device 23 and/or the switch unit 231. For instance, the second frequency f2 may be 2 MHZ or 3 MHz, and the frequency of the control voltage Vc may be larger than 2 MHz or 3 MHz.

Figure 5:
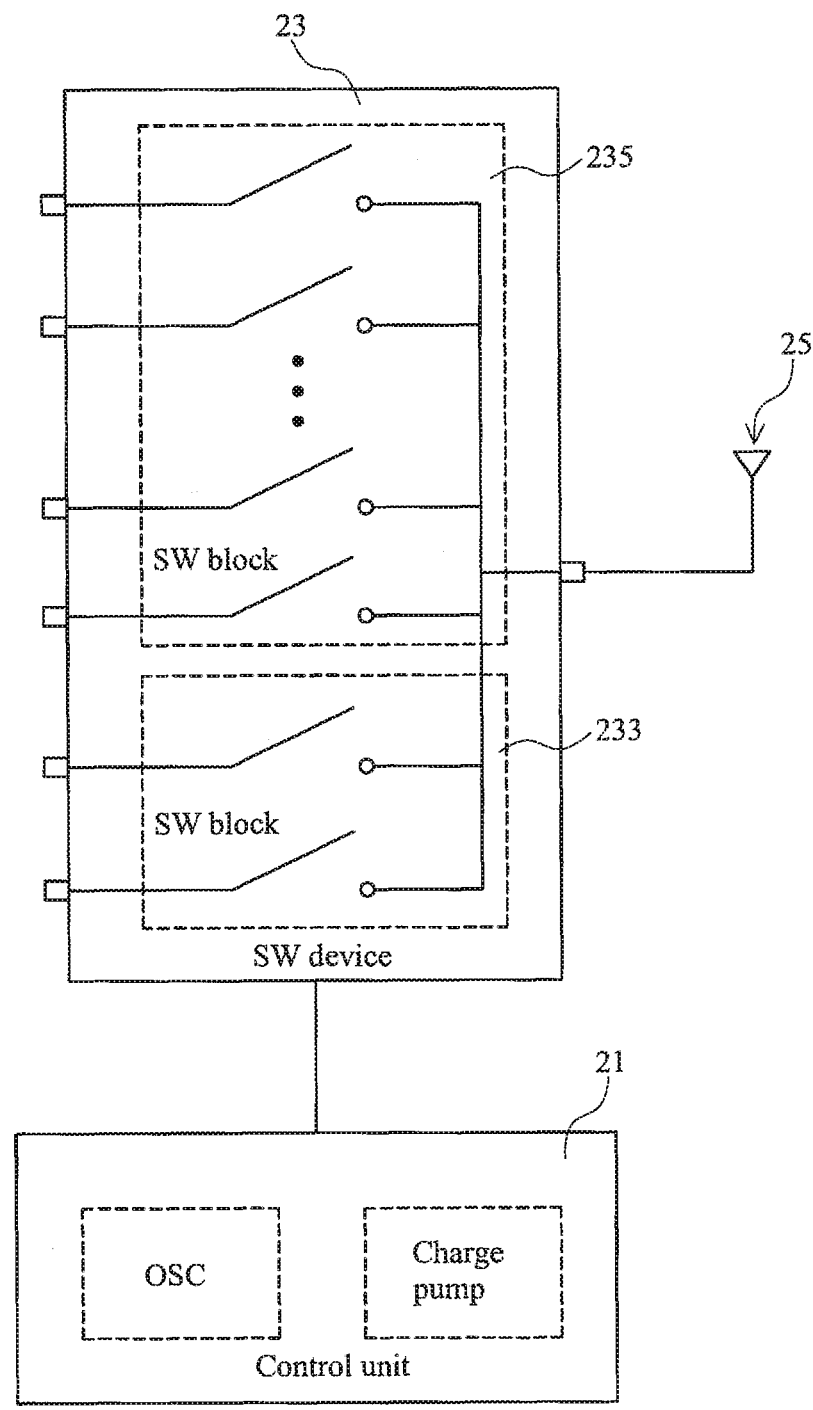
FIG. 5 is a block diagram of an RF switch module according to another embodiment of the invention.

Please referring to FIG. 5, the switch device 23 is divided into a first switch block 233 and a second switch block 235. The first switch block 233 and the second switch block 235 comprise one or a plurality of switch units 231. The first switch block 233 is used to transmit or receive the 2G RF signal, and the second switch block 235 is used to transmit or receive the 3G RF signal or the 4G RF signal. The power of the 2G RF signal, the 3G RF signal, and the 4G RF signal transmitted or received may be different, and the control device 21 is able to determine or select frequency and/or voltage value of the control voltage Vc provided to the switch device 23 according to the first and second switch blocks 233/235 that are turned on or turned off to improve isolation of the switch device 23 for the 2G RF signal, the 3G RF signal and the 4G RF signal.

The switch device 23 comprising the first and second switch block 233/235 operates in RX mode to receive the 2G RF signal, the 3G RF signal or the 4G RF signal with lower power from the antenna unit 25, and the control device 21 provides the control voltage Vc with lower frequency, such as smaller than the first frequency f1, to the switch device 23 to improve isolation of the switch device 23 and/or the switch unit 231 that is turned off to isolate the 2G RF signal, the 3G RF signal or the 4G RF signal received by the switch device 23 and/or the switch unit 231 from the antenna unit 25. For instance, the first frequency f1 may be 1 MHz, and the frequency of the control voltage Vc may be smaller than 1 MHz.

In one embodiment of the invention, the first switch block 233 receives the 2G RF signal with lower power from the antenna unit 25, and the control device 21 provides the control voltage Vc with lower frequency, such as smaller than the first frequency f1, to the second switch block 235. Moreover, the second switch block 235 receives the 3G RF signal or the 4G RF signal with lower power from the antenna unit 25, and the control device 21 provides the control voltage Vc with lower frequency, such as smaller than the first frequency f1, to the first switch block 233.

The first switch block 233 operates in TX mode to transmit the 2G RF signal with higher power to the antenna unit 25, and the control device 21 provides the control voltage Vc with higher frequency, such as larger than the second frequency f2, to the switch device 23 and/or the second switch block 235 to improve isolation of the switch device 23 and/or the second switch block 235 that is turned off to isolate the 2G RF signal transmitted by the switch device 23 and/or the first switch block 233 to the antenna unit 25. For instance, the second frequency f2 may be 2 MHZ or 3 MHz, and the frequency of the control voltage Vc may be larger than 2 MHz or 3 MHz.

The second switch block 235 operates in TX mode to transmit the 3G RF signal or the 4G RF signal with middle power to the antenna unit 25, and the control device 21 provides the control voltage Vc with middle frequency, such as smaller than the second frequency f2 and larger than the first frequency f1, to the switch device 23 and/or the first switch block 233 to improve isolation of the switch device 23 and/or the first switch block 233 that is turned off to isolate the 3G RF signal or the 4G RF signal transmitted by the switch device 23 and/or the second switch block 235 to the antenna unit 25. For instance, the first frequency f1 may be 1 MHz and the second frequency f2 may be 2 MHZ or 3 MHz, and the frequency of the control voltage Vc may be larger than 1 MHz or larger than 1 MHz and smaller than 2 MHz or 3 MHz.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A control method of an RF switch module, said RF switch module comprising a control device and a switch device, and comprising:
   during a receive operation:
      receiving a first RF signal from an antenna unit by said switch device;
      predefining at least a first frequency range and a second frequency range greater than said first frequency range;
      providing a control voltage to said switch device by said control device, the control voltage being set in frequency responsive to said first RF signal to be within said first frequency range, the control voltage being different in frequency from said first RF signal; and during a transmit operation:
transmitting a second RF signal from said switch device to said antenna unit;
providing said control voltage to said switch device by said control device, the control voltage being set in frequency responsive to said second RF signal to be within said second frequency range, the control voltage being different in frequency from said second RF signal.

2. The control method of said RF switch module according to claim 1, further comprising:
receiving said first RF signal from said antenna unit by said switch device;
providing said control voltage to said switch device by said control device, wherein frequency of said control voltage is smaller than a first frequency;
transmitting said second RF signal with higher power from said switch device to said antenna unit;
providing said control voltage to said switch device by said control device, wherein frequency of said control voltage is larger than a second frequency;
transmitting said second RF signal with middle power from said switch device to said antenna unit; and
providing said control voltage to said switch device by said control device, wherein frequency of said control voltage is larger than said first frequency or larger than said first frequency and smaller than said second frequency, and said second frequency is larger than said first frequency.

3. The control method of said RF switch module according to claim 1, wherein said first RF signal and said second RF signal comprise a second generation RF signal (2G RF signal), a third generation RF signal (3G RF signal) or a fourth generation RF signal (4G RF signal).

4. The control method of said RF switch module according to claim 3, further comprising:
receiving said first RF signal from said antenna unit by said switch device, wherein said first RF signal is said second generation RF signal (2G RF signal), said third generation RF signal (3G RF signal) or said fourth generation RF signal (4G RF signal);
providing said control voltage to said switch device by said control device, wherein frequency of said control voltage is smaller than a first frequency;
transmitting said second RF signal from said switch device to said antenna unit, wherein said second RF signal is said second generation RF signal (2G RF signal);
providing said control voltage to said switch device by said control device, wherein frequency of said control voltage is larger than a second frequency;
transmitting said second RF signal from said switch device to said antenna unit, wherein said second RF signal is said third generation RF signal (3G RF signal) or said fourth generation RF signal (4G RF signal); and
providing said control voltage to said switch device by said control device, wherein frequency of said control voltage is larger than said first frequency or larger than said first frequency and smaller than said second frequency, and said second frequency is larger than said first frequency.

5. The control method of said RF switch module according to claim 3, wherein said switch device comprises a first switch block and a second switch block, said first switch block is used to transmit or receive said second generation RF signal (2G RF signal), and said second switch block is used to transmit or receive said third generation RF signal (3G RF signal) or said fourth generation RF signal (4G RF signal).

6. The control method of said RF switch module according to claim 5, further comprising:
receiving said second generation RF signal (2G RF signal), said third generation RF signal (3G RF signal) or said fourth generation RF signal (4G RF signal) from said antenna unit by said first switch block or said second switch block;
providing said control voltage to said switch device by said control device, wherein frequency of said control voltage is smaller than a first frequency;
transmitting said second generation RF signal (2G RF signal) from said first switch block to said antenna unit;
providing said control voltage to said switch device by said control device, wherein frequency of said control voltage is larger than a second frequency;
transmitting said third generation RF signal (3G RF signal) or said fourth generation RF signal (4G RF signal) from said second switch block to said antenna unit; and
providing said control voltage to said switch device by said control device, wherein frequency of said control voltage is larger than said first frequency or larger than said first frequency and smaller than said second frequency, and said second frequency is larger than said first frequency.

7. The control method of said RF switch module according to claim 5, further comprising:
receiving said second generation RF signal (2G RF signal), said third generation RF signal (3G RF signal) or said fourth generation RF signal (4G RF signal) from said antenna unit by said first switch block or said second switch block;
providing said control voltage to said first switch block or said second switch block by said control device, wherein frequency of said control voltage is smaller than a first frequency;
transmitting said second generation RF signal (2G RF signal) from said first switch block to said antenna unit;
providing said control voltage to said second switch block by said control device, wherein frequency of said control voltage is larger than a second frequency;
transmitting said third generation RF signal (3G RF signal) or said fourth generation RF signal (4G RF signal) from said second switch block to said antenna unit; and
providing said control voltage to said first switch block by said control device, wherein frequency of said control voltage is larger than said first frequency or larger than said first frequency and smaller than said second frequency, and said second frequency is larger than said first frequency.

8. The control method of said RF switch module according to claim 1, wherein said switch device comprises a plurality of switch units, and each switch unit is used to receive said first RF signal with different power or frequency respectively or transmit said second RF signal with different power or frequency respectively.

9. The control method of said RF switch module according to claim 8, further comprising:
transmitting said first RF signal by one of said switch units;

determining frequency or voltage value of said control voltage provided to said switch device by said control device according to said switch unit transmitting said first RF signal or said second RF signal.

10. The control method of said RF switch module according to claim 8, further comprising:
turning on one of said switch units;
transmitting said first RF signal or said second RF signal by said switch unit being turned on;
turning off other said switch units; and
determining frequency or voltage value of said control voltage provided by said control device to said switch units being turned off according to said switch unit being turned on.

11. A control method of an RF switch module, said RF switch module comprising a control device and a switch device, and comprising:
predefining at least a first frequency range and a second frequency range greater than said first frequency range;
predefining at least a first voltage range and a second voltage range greater than said first voltage range;
transmitting an RF signal by said switch device; and
determining frequency and voltage value of a control voltage provided to said switch device by said control device according to frequency and power of said RF signal transmitted by said switch device,
wherein the control voltage is set in frequency and voltage responsive to said RF signal to be within one of said first and second frequency ranges and one of said first and second voltage ranges, the control voltage being different in frequency from said RF signal.

12. The control method of said RF switch module according to claim 11, wherein said switch device comprises a plurality of switch units, and each switch unit is used to transmit said RF signal with different power or frequency respectively.

13. The control method of said RF switch module according to claim 12, further comprising:
transmitting said RF signal by one of said switch units;
determining frequency or voltage value of said control voltage provided to said switch device by said control device according to said switch unit transmitting said RF signal.

14. The control method of said RF switch module according to claim 12, further comprising:
turning on one of said switch units;
transmitting said RF signal by said switch unit being turned on;
turning off other said switch units; and
determining frequency or voltage value of said control voltage provided to said switch units being turned off by said control device according to said switch unit being turned on.

15. The control method of said RF switch module according to claim 11, further comprising:
transmitting said RF signal with higher frequency or higher power by said switch device; and
providing said control voltage with higher frequency or higher voltage value to said switch device by said control device.

* * * * *